US010926638B1

(12) United States Patent
Chang et al.

(10) Patent No.: US 10,926,638 B1
(45) Date of Patent: Feb. 23, 2021

(54) METHOD AND APPARATUS THAT REFORMATS CONTENT OF EYEBOX

(71) Applicant: GM GLOBAL TECHNOLOGY OPERATIONS LLC, Detroit, MI (US)

(72) Inventors: Kai-Han Chang, Madison Heights, MI (US); Omer Tsimhoni, Bloomfield Hills, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/661,227

(22) Filed: Oct. 23, 2019

(51) Int. Cl.
*B60K 35/00* (2006.01)
*G06F 3/01* (2006.01)
*G06T 3/00* (2006.01)

(52) U.S. Cl.
CPC .............. *B60K 35/00* (2013.01); *G06F 3/013* (2013.01); *G06T 3/0006* (2013.01); *B60K 2370/149* (2019.05); *B60K 2370/1529* (2019.05); *B60K 2370/194* (2019.05); *B60K 2370/31* (2019.05); *B60K 2370/336* (2019.05)

(58) Field of Classification Search
CPC ................ B60K 35/00; B60K 2370/31; B60K 2370/149; B60K 2370/194; B60K 2370/1529; B60K 2370/336; G06F 3/013; G06T 3/0006
See application file for complete search history.

(56) References Cited

U.S. PATENT DOCUMENTS

| | | |
|---|---|---|
| 7,961,117 B1 | 6/2011 | Zimmerman et al. |
| 2010/0253593 A1 | 10/2010 | Seder et al. |
| 2012/0224062 A1 | 9/2012 | Lacoste et al. |
| 2014/0267263 A1 | 9/2014 | Beckwith et al. |
| 2016/0003636 A1 | 1/2016 | Ng-Thow-Hing et al. |
| 2016/0209647 A1 | 7/2016 | Fursich |
| 2016/0266391 A1* | 9/2016 | Han ...................... G09G 3/001 |
| 2017/0329143 A1 | 11/2017 | Svarichevsky et al. |
| 2019/0339535 A1* | 11/2019 | Abi-Chaaya ....... G02B 27/0093 |

* cited by examiner

*Primary Examiner* — Abhishek Sarma
(74) *Attorney, Agent, or Firm* — Cantor Colburn LLP

(57) ABSTRACT

A method and apparatus that reformat content of an eyebox objects are provided. The method includes: detecting a position of eyes of an occupant and determining eye position coordinates, determining whether at least one object present in the eyebox of a head up display is clipped when viewed from the eye position coordinates, and modifying the clipped object so that the clipped object is not clipped when viewed by the occupant from the eye position coordinates.

10 Claims, 3 Drawing Sheets

METHOD AND APPARATUS THAT REFORMATS CONTENT OF EYEBOX

Apparatuses and methods consistent with exemplary embodiments relate to reformatting displayed content. More particularly, apparatuses and methods consistent with exemplary embodiments relate to reformatting displayed content of a head up display.

SUMMARY

One or more exemplary embodiments provide a method and an apparatus that reformats clipped content so that the content fits within a portion of the eyebox that is visible to an occupant. More particularly, one or more exemplary embodiments provide a method and an apparatus that scale, transform, translate, remove or reformat content of the clipped object so the object is visible to an occupant in its entirety without being clipped.

According to an aspect of an exemplary embodiment, a method that reformats content visible in an eyebox is provided. The method includes detecting a position of eyes of an occupant and determining eye position coordinates, determining whether at least one object present in the eyebox of a head up display is clipped when viewed from the eye position coordinates, and modifying the clipped object so that the clipped object is not clipped when viewed by the occupant from the eye position coordinates.

The eye position coordinates may reflect a position in space with respect to the eyebox.

The eyebox may be a virtual area in space from which the image projected by the head up display is entirely visible to the occupant, and the modifying the clipped object is performed such that the modified object is displayed within a usable eyebox, which is a subset of the virtual area of the eyebox, where the modified object is completely visible to the occupant from the eye position coordinates.

The head up display may include a light source, a display, a mirror and a combiner.

The modifying the clipped object may include translating the clipped object in a direction corresponding to the eye position coordinates.

The modifying the clipped object may include scaling the clipped object to a smaller size so that the clipped object is entirely contained within a usable eyebox, which is a subset of a virtual area of the eyebox, where the modified object is completely visible to the occupant from the eye position coordinates.

The modifying the clipped object may include reorganizing, reducing, or removing content visible in the clipped object so that the clipped object is entirely contained within a usable eyebox, which is a subset of a virtual area of the eyebox, where the modified object is completely visible to the occupant from the eye position coordinates.

The head up display may include two or more virtual image planes, and the modifying the clipped object may include moving content of the clipped object from a first plane of the two planes to another plane of the two planes.

The determining whether the at least one object present in the eyebox of the head up display is clipped may include determining at least one of coordinates and size of a clipped portion of the clipped object based on the detected eye position coordinates and the distance or direction of the eye position coordinates from a center of the eyebox.

The modifying the clipped object may include transforming, translating, removing and reformatting content of the clipped object according to the determined at least one of coordinates and size of clipped portion of the clipped object.

According to an aspect of another exemplary embodiment, an apparatus that reformats content visible in an eyebox is provided. The apparatus includes at least one memory comprising computer executable instructions; and at least one processor configured to read and execute the computer executable instructions. The computer executable instructions causing the at least one processor to detect a position of eyes of an occupant and determining eye position coordinates, determine whether at least one object present in the eyebox of a head up display is clipped when viewed from the eye position coordinates; and modify the clipped object so that the clipped object is not clipped when viewed by the occupant from the eye position coordinates.

The eye position coordinates may reflect a position in space with respect to the eyebox. The eyebox may be a virtual area in space from which the image projected by the head up display is entirely visible to the occupant, and the computer executable instructions may further cause the at least one processor to modify the clipped object such that the modified object is displayed within a usable eyebox, which is a subset of the virtual area of the eyebox, where the modified object is completely visible to the occupant from the eye position coordinates.

The apparatus may further include the head up display including a light source, a display, a mirror and a combiner.

The computer executable instructions may further cause the at least one processor to modify the clipped object by translating the clipped object in a direction corresponding to the eye position coordinates.

The computer executable instructions may further cause the at least one processor to modify the clipped object by scaling the clipped object to a smaller size so that the clipped object is entirely contained within a usable eyebox, which is a subset of a virtual area of the eyebox, where the modified object is completely visible to the occupant from the eye position coordinates.

The computer executable instructions may further cause the at least one processor to modify the clipped object by reorganizing, reducing, or removing content visible in the clipped object so that the clipped object is entirely contained within a usable eyebox, which is a subset of a virtual area of the eyebox, where the modified object is completely visible to the occupant from the eye position coordinates.

The apparatus may further include the head up display, the head up display comprising two or more virtual image planes, and the computer executable instructions may further cause the at least one processor to modify the clipped object by moving content of the clipped object from a first plane of the two planes to another plane of the two planes.

The computer executable instructions further may cause the at least one processor to determine whether the at least one object present in the eyebox of the head up display is clipped by determining at least one of coordinates and size of a clipped portion of the clipped object based on the detected eye position coordinates and the distance or direction of the eye position coordinates from a center of the eyebox.

The computer executable instructions may further cause the at least one processor to modify the clipped object by transforming, translating, removing and reformatting content of the clipped object according to the determined at least one of coordinates and size of clipped portion of the clipped object. Other objects, advantages and novel features of the exemplary embodiments will become more apparent from the following detailed description of exemplary embodiments and the accompanying drawings.

DETAILED DESCRIPTION

Figure 1:
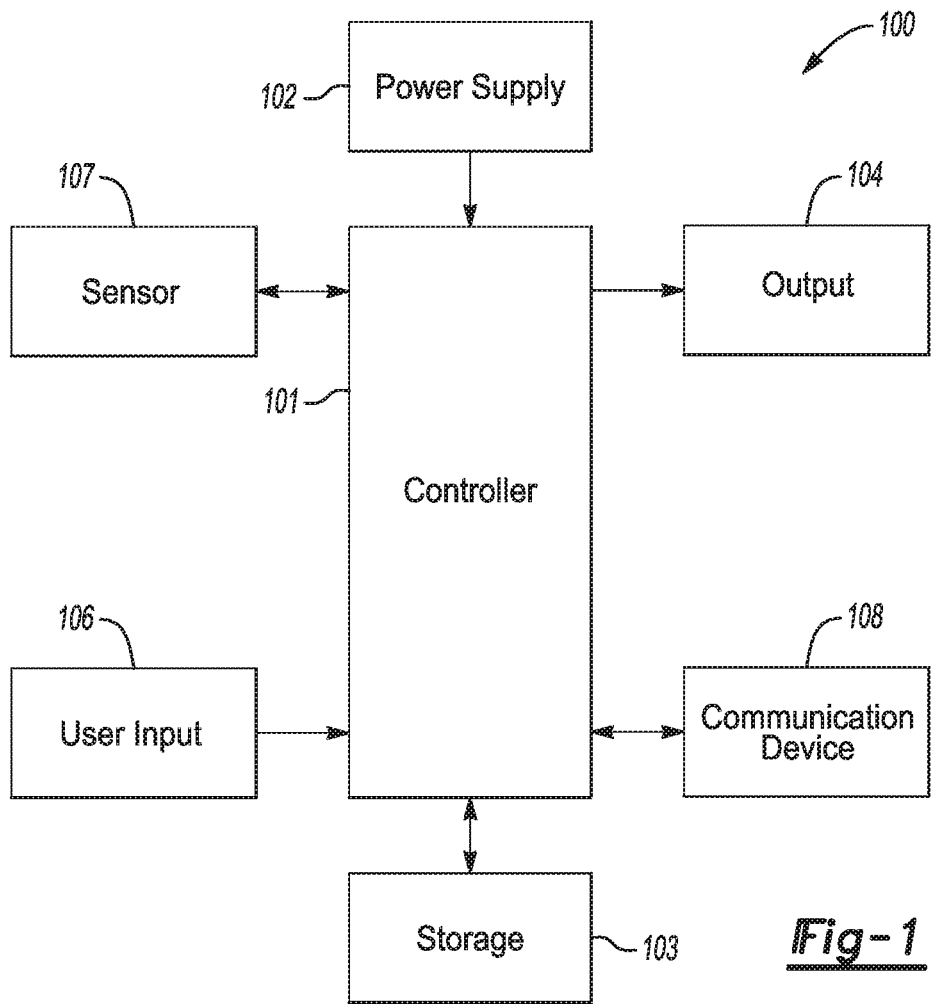
FIG. 1 shows a block diagram of an apparatus that reformats content of an eyebox according to an exemplary embodiment.

An apparatus and method that reformat content of an eyebox will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Vehicles are equipped with head up displays that provide occupants with information, while minimizing the time which occupants' gaze and attention are off of the road. Head up displays have a limited eyebox due to the limited aperture and size of optical components inside the HUD. The eyebox is an area in the space where the projected content of the HUD is entirely visible to the occupant without post-image processing. The center of the eyebox is designated as the center of the eyellipse defined by vehicle geometry. The usable eyebox may be a subset of the virtual area of the eyebox. The usable eyebox is an area where content may be viewed unclipped in its entirety from the current eye position coordinates of the occupant if the content is modified to fit in the usable eyebox.

The limited size of an eyebox may create a clipping effect on projected information or content when one or both eyes of the occupant are positioned outside of the eyebox. If a viewer's eye is located outside of the eyebox or is offset from a position where the entire content or projected information is viewable, the projected information or content is not seen in that eye or may be clipped when viewed from the eye position coordinates of the viewer. To address the clipping effect due to limited eyebox size and the clipped projected object, an operator may have to reposition their head or body. However, another method may be to modify or reformat the content displayed by the head-up display into the usable eyebox in such a way so that the content appears to be complete or unclipped to an operator thereby effectively allowing the occupant or operator to view complete or coherent content.

FIG. 1 shows a block diagram of an apparatus that reformats content of an eyebox 100 according to an exemplary embodiment. As shown in FIG. 1, the apparatus that reformats content of an eyebox 100, according to an exemplary embodiment, includes a controller 101, a power supply 102, a storage 103, an output 104, a user input 106, a sensor 107, and a communication device 108. However, the apparatus that reformats content of an eyebox 100 is not limited to the aforementioned configuration and may be configured to include additional elements and/or omit one or more of the aforementioned elements. The apparatus that reformats content of an eyebox 100 may be implemented as part of a vehicle or as a standalone component.

The controller 101 controls the overall operation and function of the apparatus that reformats content of an eyebox 100. The controller 101 may control one or more of a storage 103, an output 104, a user input 106, a sensor 107, and a communication device 108 of the apparatus that reformats content of an eyebox 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the sensor 107, and the communication device 108 of the apparatus that reformats content of an eyebox 100. The information may be sent and received via a bus or network, or may be directly read or written to/from one or more of the storage 103, the output 104, the user input 106, the sensor 107, and the communication device 108 of the apparatus that reformats content of an eyebox 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the output 104, the user input 106, the sensor 107, and the communication device 108 of the apparatus that reformats content of an eyebox 100. The power supply 102 may include one or more from among a battery, an outlet, a capacitor, a solar energy cell, a generator, a wind energy device, an alternator, etc.

The storage 103 is configured for storing information and retrieving information used by the apparatus that reformats content of an eyebox 100. The storage 103 may be controlled by the controller 101 to store and retrieve information about content, objects, eye position, and the eyebox. The storage 103 may also include the computer instructions configured to be executed by a processor to perform the functions of the apparatus that reformats content of an eyebox 100. The information about objects or content may include one or more from among dimensions, area, priority or importance, and displayed information. The information about eye position may include coordinate information. The information about the eyebox may include eyebox size, coordinate bounds, center coordinates.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that reformats content of an eyebox 100. The output 104 may include one or more from among a speaker, a display, a transparent display, a centrally-located display, a head up display, a windshield display, a haptic feedback device, a vibration device, a tactile feedback device, a tap-feedback device, a holographic display, an instrument light, an indicator light, etc. In one example, the output 104 is a head up display that displays objects or contents using graphical indicators showing things such as speed, temperature or other information. The graphical indicator may have adjustable features including a shading of a graphical indicator, a transparency of a graphical indicator, a size of a graphical indicator, a size of a graphical indicator relative to other graphical indicators, a color of a graphical indicator, a shape of a graphical indicator.

The user input 106 is configured to provide information and commands to the apparatus that reformats content of an eyebox 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle through objects, graphical indicators or content on the head up display.

The sensor 107 is configured to detect an occupant. The sensor 107 may be one or more sensors from among a radar sensor, a microwave sensor, an ultrasonic sensor, a camera, an infrared sensor, a LIDAR, and a laser sensor. In one example, the sensor 107 is implemented as a camera in a driver monitoring system. For example, the controller 101 may receive information about the eye position of the occupant from the sensor 107. The information from the sensor 107 may be provided to the controller 101 via a bus, storage 103 or communication device 108.

The communication device 108 may be used by the apparatus that reformats content of an eyebox 100 to communicate with various types of external apparatuses according to various communication methods. The communication device 108 may be used to send/receive object information to/from the controller 101 of the apparatus that reformats content of an eyebox 100. The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

The controller 101 of the apparatus that reformats content of an eyebox 100 may be configured to detect a position of eyes of an occupant and determining eye position coordinates, determine whether at least one object present in the eyebox of a head up display is clipped when viewed from the eye position coordinates; and modify the clipped object so that the clipped object is not clipped when viewed by the occupant from the eye position coordinates.

The controller 101 of the apparatus that reformats content of an eyebox 100 may be configured to modify the clipped object such that the modified object is displayed within a usable eyebox, which is a subset of the virtual area of the eyebox, where the modified object is completely visible to the occupant from the eye position coordinates.

The controller 101 of the apparatus that reformats content of an eyebox 100 may also be configured to modify the clipped object by translating the clipped object in a direction corresponding to the eye position coordinates.

The controller 101 of the apparatus that reformats content of an eyebox 100 may also be configured to modify the clipped object by scaling the clipped object to a smaller size so that the clipped object is entirely contained within a usable eyebox, which is a subset of a virtual area of the eyebox, where the modified object is completely visible to the occupant from the eye position coordinates.

The controller 101 of the apparatus that reformats content of an eyebox 100 may also be configured to control to modify the clipped object by reorganizing, reducing, or removing content visible in the clipped object so that the clipped object is entirely contained within a usable eyebox, which is a subset of a virtual area of the eyebox, where the modified object is completely visible to the occupant from the eye position coordinates.

The controller 101 of the apparatus that reformats content of an eyebox 100 may also be configured to modify the clipped object by moving content of the clipped object from a first plane of the two planes to another plane of the two planes.

The controller 101 of the apparatus that reformats content of an eyebox 100 may also be configured to determine whether the at least one object present in the eyebox of the head up display is clipped by determining at least one of coordinates and size of a clipped portion of the clipped object based on the detected eye position coordinates and the distance or direction of the eye position coordinates from a center of the eyebox. The controller 101 may then modify the clipped object by transforming, translating, removing and reformatting content of the clipped object according to the determined at least one of coordinates and size of clipped portion of the clipped object.

Figure 2:
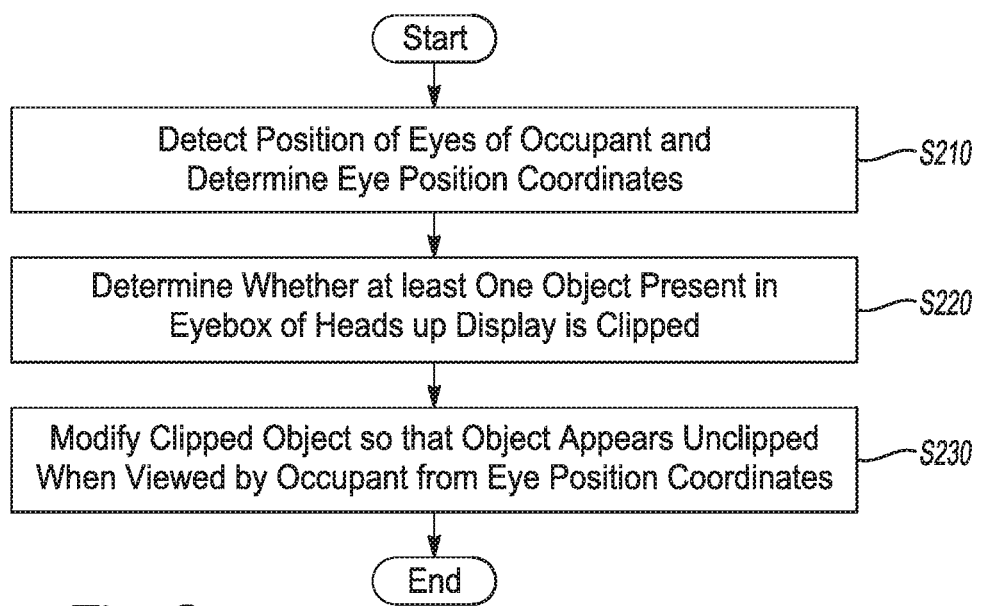
FIG. 2 shows a flowchart for a method that reformats content of an eyebox according to an exemplary embodiment.

FIG. 2 shows a flowchart for a method that reformats content of an eyebox according to an exemplary embodiment. The method of FIG. 2 may be performed by the apparatus that reformats content of an eyebox 100 or may be encoded into a computer readable medium as instructions that are executable by a computer to perform the method.

Referring to FIG. 2, the position of the eyes of the occupant are detected and the eye position coordinates are detected in operation S210. Based on the eye position coordinates, it is then determined whether the at least one object present in the eyebox is clipped in operation S220. In operation S230, the clipped object is modified so that object becomes unclipped when viewed by occupant from eye position coordinates. The modification of the object may include one or more of scaling, transforming, translating, removing and reformatting content of the object so that the content fits into a usable eyebox.

Figure 3:
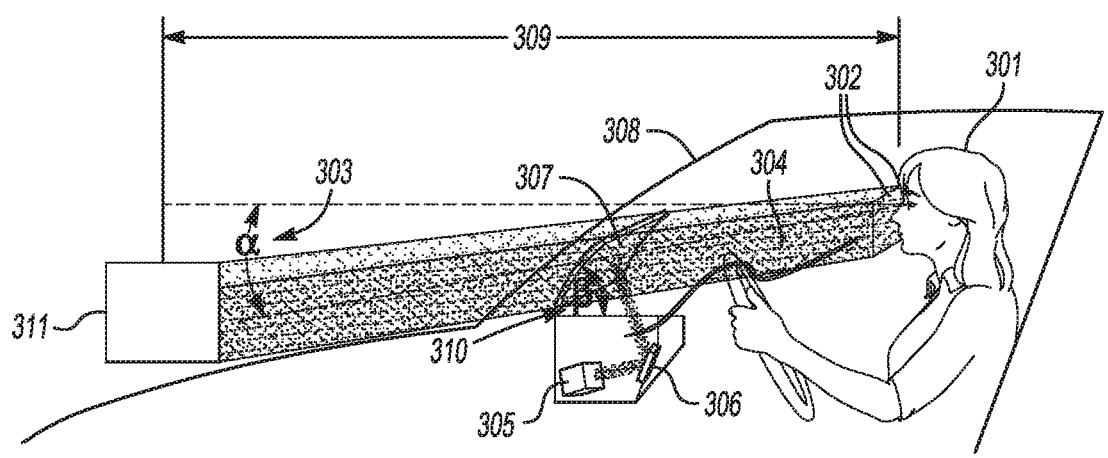
FIG. 3 shows an illustration of an occupant viewing a head up display apparatus according to an aspect of an exemplary embodiment.

FIG. 3 shows an illustration of an occupant viewing a head up display apparatus according to an aspect of an exemplary embodiment. The occupant 301 is able to view virtual image 311 through the eyebox 302. The eyebox is determined by the aperture of each optical components in the head up display and the viewing angle of the picture generating unit (PGU). The head up display apparatus include a picture generation unit 305 comprising a light source and display. A fold mirror 306 reflects the picture generated by picture generation unit 305 at optical component 307 which creates an optical path 304. The fold mirror 306 may be planar or aspherical. The optical component 307 may be a combiner or a windshield.

Figure 4:
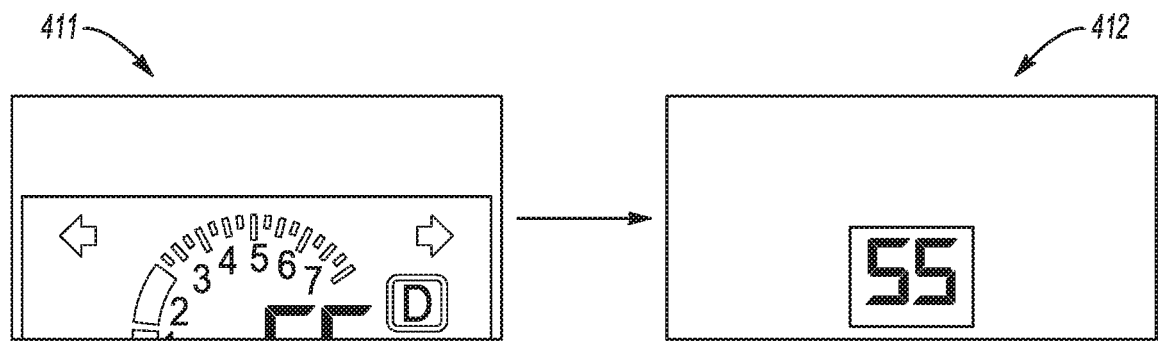
FIG. 4 shows illustrations of reformatted content of an eyebox according to an aspect of an exemplary embodiment.
Figure 4:
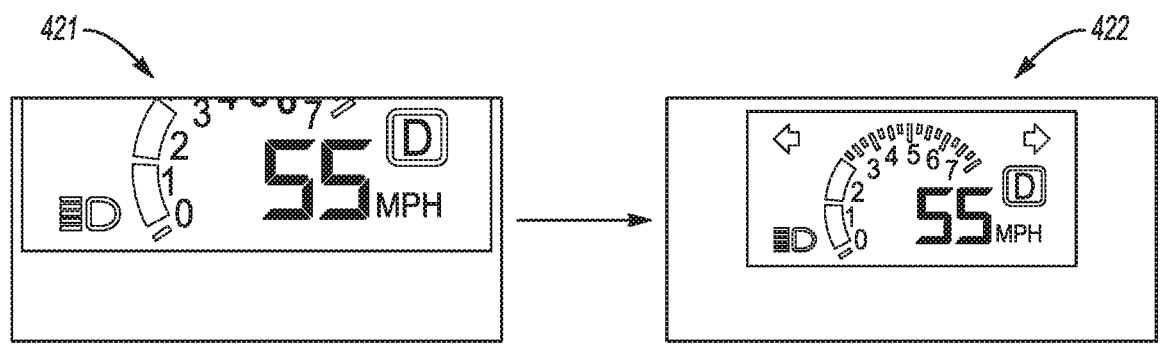
Figure 4:
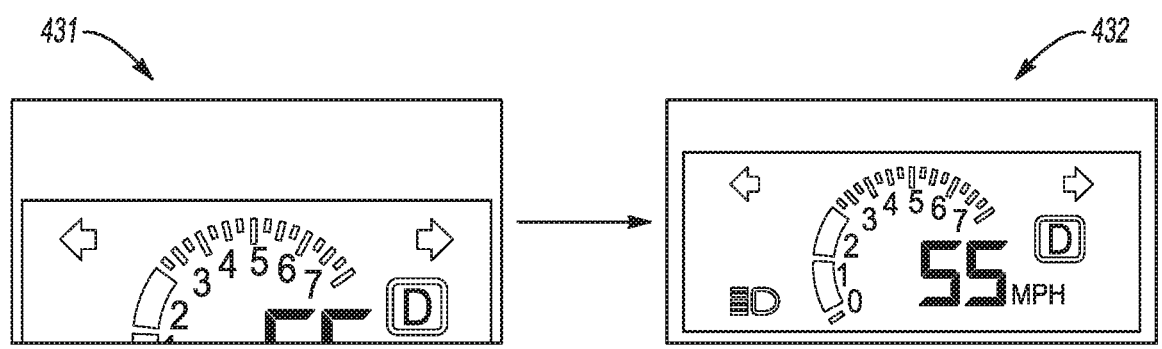

FIG. 4 shows illustrations of reformatted content of eyebox according to an aspect of an exemplary embodiment. Referring to FIG. 4, three examples of content modifications are shown. However, the apparatus and method that reformat content are not limited to the three examples and may include other methods of reformatting content now shown in FIG. 4.

Illustration 411 shows content clipped from the bottom when viewed by an occupant from a position that is above or higher than the eyebox. If this type of clipping occurs and depending on the size of the position of the eyes of the occupant, the content may be reorganized and reduced in illustration 412 in such that only the speed is visible in an unclipped manner to the occupant from the occupant's detected eye position coordinates. In this example, the content of the object may be prioritized by importance and the content may be displayed according to the importance and the area of the eyebox that is viewable by the occupant from the occupant's detected eye position.

Illustration 421 shows content clipped from the bottom when viewed by an occupant from a position that is lower or below the eyebox. If this type of clipping occurs and depending on the size of the position of the eyes of the occupant, the content may be scaled to smaller size and translated in illustration 422 in such that only the entire content is visible in an unclipped manner to the occupant from the occupant's detected eye position coordinates. In this example, the content or the object may be scaled to a reduced size according to the area of the eyebox that is viewable by the occupant from the occupant's detected eye position.

Illustration 431 shows content clipped from the bottom when viewed by an occupant from a position that is above or higher than the eyebox. If this type of clipping occurs and depending on the image size viewable at the position of the eyes of the occupant, the content may be translated upwards and skewed in illustration 432 such that the entire content is visible in an unclipped manner to the occupant from the occupant's detected eye position coordinates. In this example, the content or the object may still fit in the area of the eyebox that is viewable by the occupant and so content or the object is moved to an area of the eyebox that is viewable by the occupant from the occupant's detected eye position.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. An apparatus that reformats content of an eyebox of a head up display, the apparatus comprising:
   at least one memory comprising computer executable instructions; and
   at least one processor configured to read and execute the computer executable instructions, the computer executable instructions causing the at least one processor to:
   detect a position of eyes of an occupant and determining eye position coordinates reflecting a three-dimensional position in space with respect to the eyebox;
   determine whether a projected object comprises a clipped object comprising content that cannot be viewed by the occupant from the eye position coordinates; and
   modify the projected object by scaling the projected object to a smaller size so that the clipped object content that cannot be viewed by the occupant from the eye position coordinates is entirely visible in the modified projected object when viewed by the occupant from the eye position coordinates.

2. An apparatus that reformats content of an eyebox of a head up display, the apparatus comprising:
   at least one memory comprising computer executable instructions; and at least one processor configured to read and execute the computer executable instructions, the computer executable instructions causing the at least one processor to:

detect a position of eyes of an occupant and determining eye position coordinates reflecting a three-dimensional position in space with respect to the eyebox;

determine whether a projected object comprises a clipped object comprising content that cannot be viewed by the occupant from the eye position coordinates; and modify the projected object by reducing, or removing the clipped object content that cannot be seen when viewed from the eye position coordinates so that the modified projected object is entirely visible when viewed by the occupant from the eye position coordinates.

3. An apparatus that reformats content of an eyebox of a head up display, the apparatus comprising:

at least one memory comprising computer executable instructions;

a head up display comprising two or more virtual image planes; and at least one processor configured to read and execute the computer executable instructions, the computer executable instructions causing the at least one processor to:

detect a position of eyes of an occupant and determining eye position coordinates reflecting a three-dimensional position in space with respect to the eyebox;

determine whether a projected object comprises a clipped object comprising content that cannot be viewed by the occupant from the eye position coordinates; and modify the clipped object by moving content of the projected object from a first plane of the two planes to another plane of the two planes.

4. An apparatus that reformats content of an eyebox of a head up display, the apparatus comprising:

at least one memory comprising computer executable instructions; and at least one processor configured to read and execute the computer executable instructions, the computer executable instructions causing the at least one processor to:

detect a position of eyes of an occupant and determining eye position coordinates reflecting a three-dimensional position in space with respect to the eyebox;

determine whether a projected object comprises a clipped object comprising content that cannot be viewed by the occupant from the eye position coordinates; and modify the projected object so that the clipped object is not projected when viewed by the occupant from the eye position coordinates;

wherein determining whether a projected object comprises a clipped object comprising content that cannot be viewed by the occupant from the eye position coordinates comprises determining at least one of coordinates and size of a clipped portion of the clipped object based on the determined eye position coordinates and a distance of the eye position coordinates from a center of the eyebox.

5. The apparatus of claim 4, wherein the computer executable instructions further cause the at least one processor to modify the projected object by removing content of the projected object according to the determined at least one of coordinates and size of the clipped portion of the clipped object.

6. A method that reformats content of an eyebox of a head up display, the method comprising:

detecting a position of eyes of an occupant and determining eye position coordinates reflecting a three-dimensional position in space with respect to the eyebox;

determining whether a projected object comprises a clipped object comprising content that cannot be viewed by the occupant from the eye position coordinates; and modifying the projected object comprising scaling the projected object to a smaller size so that the clipped object content that cannot be viewed by the occupant from the eye position coordinates is entirely visible in the modified projected object when viewed by the occupant from the eye position coordinates.

7. A method that reformats content of an eyebox of a head up display, the method comprising:

detecting a position of eyes of an occupant and determining eye position coordinates reflecting a three-dimensional position in space with respect to the eyebox;

determining whether a projected object comprises a clipped object comprising content that cannot be viewed by the occupant from the eye position coordinates; and modifying the projected object comprising, reducing or removing the clipped object content that cannot be viewed by the occupant from the eye position coordinates so that the modified projected object is entirely visible when viewed by the occupant from the eye position coordinates.

8. A method that reformats content of an eyebox of a head up display, the method comprising:

detecting a position of eyes of an occupant and determining eye position coordinates reflecting a three-dimensional position in space with respect to the eyebox;

determining whether a projected object comprises a clipped object comprising content that cannot be viewed by the occupant from the eye position coordinates;

wherein the head up display comprises two or more virtual image planes; and moving content of the clipped object from a first plane of the two planes to another plane of the two planes.

9. A method that reformats content of an eyebox of a head up display, the method comprising:

detecting a position of eyes of an occupant and determining eye position coordinates reflecting a three-dimensional position in space with respect to the eyebox;

determining whether a projected object comprises a clipped object comprising content that cannot be viewed by the occupant from the eye position coordinates; and modifying the projected object so that the modified projected object is not clipped when viewed by the occupant from the eye position coordinates;

wherein the determining whether a projected object comprises a clipped object comprising content that cannot be viewed by the occupant from the eye position coordinates further comprises determining at least one of coordinates and size of a clipped portion of the clipped object based on the determined eye position coordinates and a distance of the eye position coordinates from a center of the eyebox.

10. The method of claim 9, wherein the modifying the projected object comprises removing content of the projected object according to the determined at least one of coordinates and size of the clipped portion of the clipped object.

* * * * *